United States Patent
Skjæveland

(10) Patent No.: US 9,961,821 B2
(45) Date of Patent: May 8, 2018

(54) WEARING POINT DEVICE WITH A QUICK COUPLING

(71) Applicant: KVERNELAND GROUP OPERATIONS NORWAY AS, Kvernaland (NO)

(72) Inventor: Magne Skjæveland, Klepp St. (NO)

(73) Assignee: KVERNELAND GROUP OPERATIONS NORWAY AS, Kvernaland (NO)

( * ) Notice: Subject to any disclaimer, the term of this patent is extended or adjusted under 35 U.S.C. 154(b) by 23 days.

(21) Appl. No.: 15/029,530

(22) PCT Filed: Oct. 8, 2014

(86) PCT No.: PCT/NO2014/050189
§ 371 (c)(1),
(2) Date: Apr. 14, 2016

(87) PCT Pub. No.: WO2015/057078
PCT Pub. Date: Apr. 23, 2015

(65) Prior Publication Data
US 2016/0255757 A1    Sep. 8, 2016

(30) Foreign Application Priority Data
Oct. 18, 2013    (NO) .................................. 20131382

(51) Int. Cl.
*A01B 15/06*    (2006.01)
*A01B 23/02*    (2006.01)
*E02F 9/28*    (2006.01)

(52) U.S. Cl.
CPC .............. *A01B 15/06* (2013.01); *A01B 23/02* (2013.01); *E02F 9/2825* (2013.01);
(Continued)

(58) Field of Classification Search
CPC ....... A01B 15/06; A01B 23/02; E02F 9/2825; E02F 9/2833; E02F 9/2858; E02F 9/2808
See application file for complete search history.

(56) References Cited

U.S. PATENT DOCUMENTS 2,968,880 A * 1/1961 Petersen ............... E02F 9/2841
                                                                 175/391
3,136,077 A    6/1964 Troeppl
(Continued)

FOREIGN PATENT DOCUMENTS

EP    1 259 105 B1    4/2006
EP    205 8 440 A1    5/2009
(Continued)

*Primary Examiner* — Jamie L McGowan
(74) *Attorney, Agent, or Firm* — Foley & Lardner LLP

(57) ABSTRACT

A wearing-point device (22) with a quick-coupling formed from a coupling portion (211) of a wearing-part holder (21) and corresponding attachment portions (223) of the wearing point (22), in which a longitudinal elevation (224) extends with a desired height from a front portion (221) towards the attachment portion (223), sliding surfaces (222, 222') extending in a downward-sloping manner from the longitudinal center plane of the wearing point (22) in the directions of opposite side edges (228) of the wearing point (22) and forming a downward-sloping rear edge (227) that forms an interface towards the attachment portions (223).

6 Claims, 2 Drawing Sheets

(52) U.S. Cl.
CPC .......... *E02F 9/2833* (2013.01); *E02F 9/2858* (2013.01); *E02F 9/2808* (2013.01)

(56) References Cited

U.S. PATENT DOCUMENTS

| | | | | |
|---|---|---|---|---|
| 3,312,002 A * | 4/1967 | Benetti | ................ | E02F 9/2841 |
| | | | | 37/452 |
| 3,426,459 A * | 2/1969 | Petersen | ............... | E02F 9/2841 |
| | | | | 37/446 |
| 3,736,676 A * | 6/1973 | Sturgeon | ............... | E02F 9/2858 |
| | | | | 172/713 |
| 4,269,274 A | 5/1981 | Robertson et al. | | |
| D284,010 S * | 5/1986 | Voyce | ........................... | D15/29 |
| 4,754,816 A | 7/1988 | Edmission | | |
| 6,443,237 B1 | 9/2002 | Myers et al. | | |
| 6,607,040 B2 * | 8/2003 | Skjaeveland | .......... | A01B 15/06 |
| | | | | 172/749 |
| 8,191,291 B2 * | 6/2012 | Vanderpoorten | ..... | E02F 9/2858 |
| | | | | 37/453 |
| 8,281,505 B2 * | 10/2012 | Karlsson | ............... | E02F 9/2833 |
| | | | | 37/446 |
| 8,528,238 B2 * | 9/2013 | Skjæveland | .......... | E02F 9/2858 |
| | | | | 37/455 |
| 8,875,424 B2 * | 11/2014 | Moller | .................. | A01B 15/06 |
| | | | | 37/452 |
| 9,485,897 B2 * | 11/2016 | Skjæveland | .......... | E02F 9/2825 |
| 9,603,296 B2 * | 3/2017 | Skjaeveland | .......... | A01B 15/06 |
| 2005/0050775 A1 | 3/2005 | Clendenning et al. | | |
| 2012/0279096 A1 | 11/2012 | Skjæveland | | |

FOREIGN PATENT DOCUMENTS

| | | |
|---|---|---|
| GB | 0 865 840 | 4/1961 |
| NO | 332031 B1 | 6/2011 |
| WO | WO-2009/082317 A1 | 7/2009 |
| WO | WO 2013-078101 A | 5/2013 |

* cited by examiner

WEARING POINT DEVICE WITH A QUICK COUPLING

BACKGROUND

The invention relates to a wearing-point device with a quick coupling formed from a coupling portion of a wearing-part holder and a corresponding attachment portion of the wearing point.

On soil-working implements, for example ploughs and cultivators, it is known to use wearing points with quick couplings, see for example the applicant's own Norwegian patent NO 332031. A problem with such wearing-point arrangements is that the quick coupling partially wears in step with the wearing point itself. The transverse eminence according to NO 332031 tries to remedy this, but it has turned out that as said eminence wears down, the wearing point is weakened and tends to break.

SUMMARY

The invention has for its object to remedy or reduce at least one of the drawbacks of the prior art or at least provide a useful alternative to the prior art.

The object is achieved through features, which are specified in the description below and in the claims that follow.

Surprisingly, it has turned out that by forming a wearing point with a longitudinal elevation with an increasing height from a front portion of the wearing point to the transition to a quick-coupling attachment, a favourable effect is achieved both on the durability of the quick-coupling attachment and on the durability of a possible transverse elevation of the kind that is described in NO 332031. The longitudinal, rising elevation results in the upward-facing wearing surfaces of the wearing point exhibiting transverse downward slopes outwards from the longitudinal centre line of the wearing point. These inclined wearing surfaces have the effect of the adjacent unconsolidated mass that is sliding along the wearing surfaces partly being guided sideways away from the centre portion of the wearing point and thereby away from the quick-coupling details as well. Besides, the longitudinal, rising elevation results in the ability to provide the possible transverse eminence with a more favourable geometry, which results in both a lower risk of cracks growth while the wearing point is being formed and a larger material thickness in the front portion of the transverse eminence by hot shaping (forging), which is a common, rational production method for components of this kind.

The maximum height of the longitudinal elevation is typically in the range of 8-12 mm.

The invention relates more specifically to a wearing-point device with a quick-coupling formed from a coupling portion of a wearing-part holder and a corresponding attachment portion of the wearing point, wherein the wearing-part holder is provided with a sliding surface which is defined towards the wearing point by a forward sliding-surface edge and lies on approximately the same level as corresponding sliding surfaces on the attachment portions, and the wearing point is provided with sliding surfaces with a downward sloping rear edge forming an interface towards the attachment portions, the forward sliding-surface edge being formed of a transverse eminence, characterized by a longitudinal elevation extending with an increasing height from a front portion towards the attachment portion, said sliding surfaces extending in a downward-sloping manner from the vertical centre plane of the wearing point-in the directions of opposite side edges of the wearing point.

The downward-sloping rear edge may be formed of a transverse eminence with a height that is 2-5 mm larger than the maximum height of the longitudinal elevation.

The maximum height of the longitudinal elevation lies in the range of 10-15 mm.

The ratio of the maximum height of the longitudinal elevation to the width of a coupling mount may be in the range of 0.15-0.30.

BRIEF DESCRIPTION OF THE DRAWINGS

In what follows, examples of preferred embodiments are described, which is visualized in the accompanying drawings, in which.

DETAILED DESCRIPTION

In what follows, reference being made to the drawings, preferred exemplary embodiments of a replaceable wearing point according to the invention, adapted for mounting on an implement with one or more working front edges or fronts that are arranged to work in a specific material and that are subjected to wear over time, will be described.

Even though the tem "wearing point" is used, the invention is not limited to wearing parts with pointed fronts, but also covers wearing parts with front portions of other shapes.

The preferred exemplary embodiments that are described are connected with soil-working implements for use in agricultural operations, but it will be understood that the invention has a further application, as it can be used on replaceable working shares of a kind known per se, and for other types and combinations of tools requiring the fitting of replaceable wearing parts held fixed by a wearing-part holder whose life should desirably be extended.

The operative direction of motion of an implement 1 is indicated by an arrow R.

Figure 1:
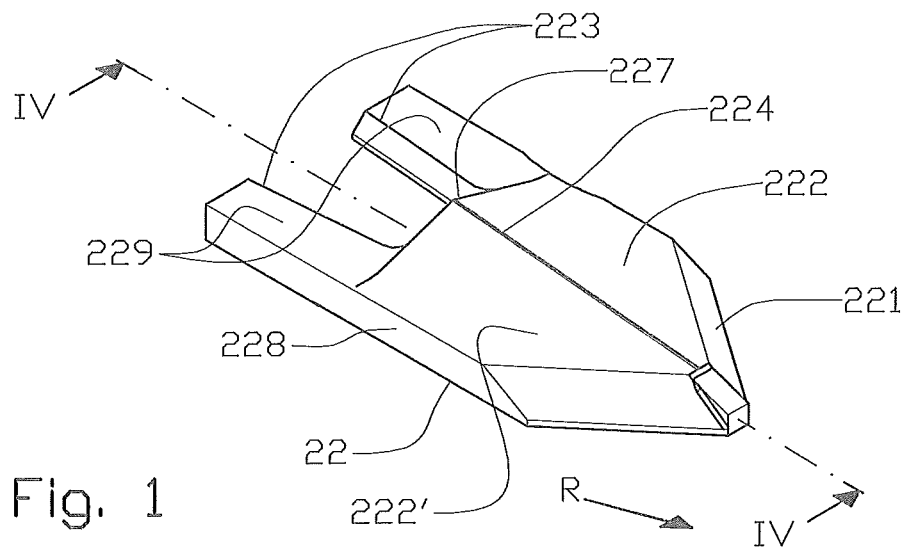
FIG. 1 shows a first embodiment of a wearing point according to the invention in perspective.
Figure 2:
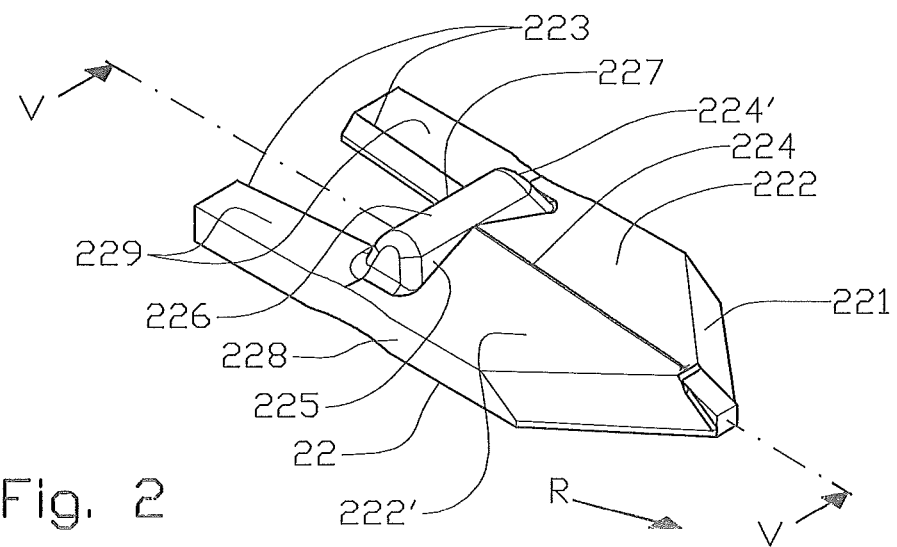
FIG. 2 shows a second embodiment of a wearing point according to the invention in perspective.
Figure 3:
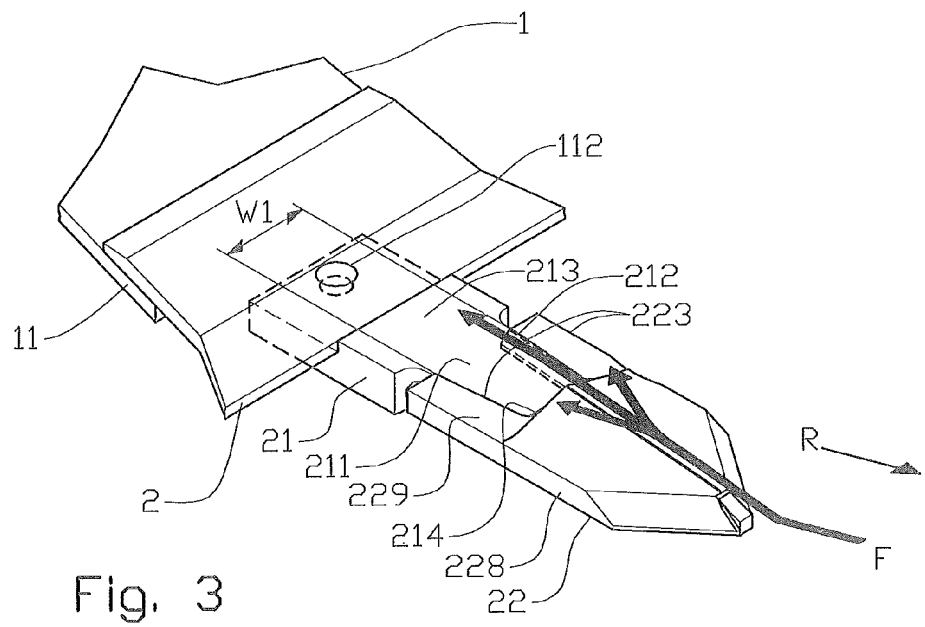
FIG. 3 shows a perspective view on a smaller scale of an assembled implement with a first embodiment of the wearing point according to the invention.
Figure 4:
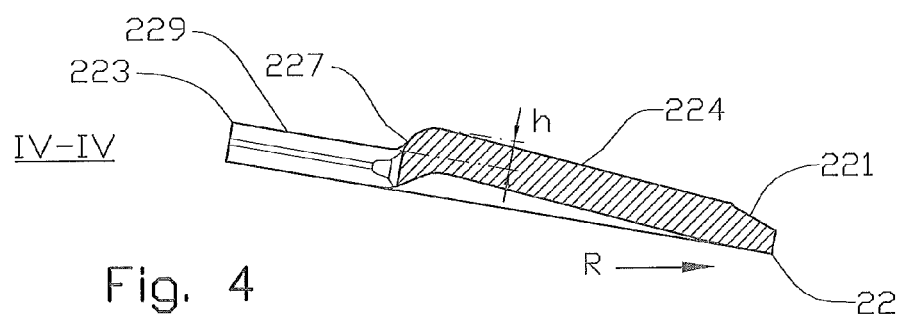
FIG. 4 shows a longitudinal section through the wearing point as is indicated by IV-IV in FIG. 1.
Figure 5:
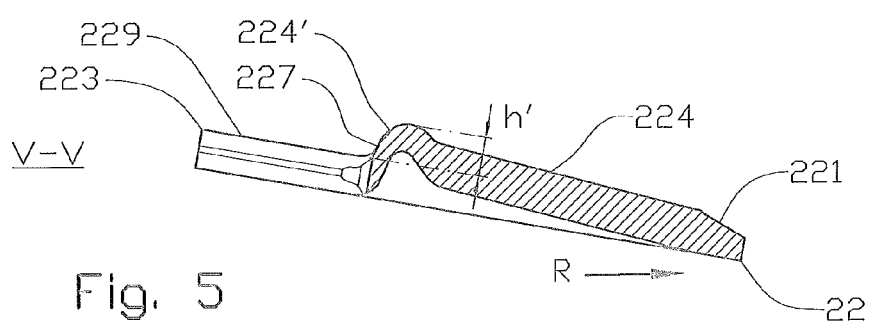
FIG. 5 shows a longitudinal section through the wearing point as is indicated by V-V in FIG. 2.

On the implement 1, an attachment portion 11 (see FIG. 3) has been formed for a replaceable leading edge element 2. The edge element 2 may be formed as a share of a plough or as a levelling share, a jaw of an excavator bucket, an end portion of a cultivator tine and so on. On the edge element 2, a wearing-part holder 21 has been integrated, shown here as attached to the implement 1 by means of a fixing bolt 112 that has been passed through a portion of the wearing-part holder 21 and the edge element 2. The wearing-part holder 21 is provided with a mount 211 including profiled abutment surfaces 212 which are arranged to engage with a corresponding attachment portion 223 of a replaceable wearing point 22 (see FIGS. 1 and 2). The wearing-part holder 21 is provided with a sliding surface 213 which is defined towards the wearing point 22 by a forward sliding-surface edge 214 and lies on roughly the same level as corresponding sliding surfaces 229 on the attachment portions 223.

The replaceable wearing point 22 is provided with a front portion 221, which, in the exemplary embodiment shown, is formed to easily penetrate into a mass in which the implement 1 is going to be moved. The wearing point 22 is provided with a longitudinal elevation 224 forming two sliding surfaces 222, 222' sloping evenly outwards towards the side edges 228 of the wearing point 22 from the vertical centre plane of the wearing point 22. The longitudinal elevation forms a downward-sloping rear edge 227 facing the attachment portions 223 of the wearing point and forming an interface towards the attachment portions 223.

In a second embodiment (see FIG. 2), the longitudinal elevation 224 ends in a transverse eminence 224' that forms a boundary portion between the longitudinal elevation and the attachment portions 223. See NO 332031 for more details concerning the design of the transverse eminence 224'.

A material flow across the sliding surfaces 213, 222, 222' of the wearing part 22 and the wearing-part holder 21 is indicated by the arrow F. The effect of the longitudinal elevation 224 is shown by the change of direction of the arrow F, as the downward-sloping sliding surfaces 222, 222' guide parts of the material flow F out towards the side edges 228 of the wearing point 22 and the rear edge 227 of the longitudinal elevation lifts the material flow F clear of the wearing-part holder 21.

The maximum height h of the longitudinal elevation 224 above the sliding surfaces 229 of the attachment portions 223 lies in the range of 10-15 mm for a wearing point 22 with a wearing-point holder 21 with a mount width W1 in the range of 45-55 mm. The ratio of the maximum height h of the longitudinal elevation to the width W1 of the mount lies more generally in the range of 0.15-0.30. The height of the transverse eminence 224' is indicated by the reference h'. In combination with the transverse eminence 224', the maximum height h of the longitudinal elevation 224 is somewhat smaller than the height h' of the transverse eminence 224', typically 2-5 mm smaller.

The invention claimed is:

1. A wearing point device comprising:
a wearing-part holder; and
a wearing point,
wherein the wearing-part holder includes a coupling portion configured to form a quick-coupling with attachment portions of the wearing point,
wherein the wearing-part holder includes a first sliding surface that is defined towards the wearing point by a forward sliding-surface edge,
wherein the first sliding surface lies on approximately a same level as sliding surfaces provided on the attachment portions,
wherein the wearing point includes second sliding surfaces having a downward-sloping rear edge forming an interface towards the attachment portions, the downward-sloping rear edge being formed by a transverse eminence,
wherein a longitudinal elevation extends with an increasing height from a front portion of the wearing point to the attachment portions,
wherein the second sliding surfaces extend in a downward-sloping manner from a vertical center plane of the wearing point towards opposite side edges of the wearing point, and
wherein the first sliding surface and the second sliding surfaces are outer surfaces exposed to wear from a flow of material thereon.

2. The device according to claim 1, wherein the transverse eminence has a height that is 2 to 5 mm larger than a maximum height of the longitudinal elevation.

3. The device according to claim 1, wherein a maximum height of the longitudinal elevation is 10 to 15 mm.

4. The device according to claim 1, wherein a ratio of a maximum height of the longitudinal elevation to a width of a coupling mount of the wearing point is 0.15 to 0.30.

5. The device according to claim 1, wherein the transverse eminence forms a boundary portion between the longitudinal elevation and the attachment portions.

6. The device according to claim 1, wherein a width of the transverse eminence is greater than a distance between the attachment portions of the wearing point.

* * * * *